United States Patent
Hering

[11] 3,754,789
[45] Aug. 28, 1973

[54] PROCESS FOR RECOVERING HEAVY MINERAL BY SELECTIVE SEDIMENTATION FROM A BODY OF FLOWING WATER

[75] Inventor: Norbert Hering, Frankfurt, Germany

[73] Assignee: Metallgesellschaft Aktiengesellschaft, Frankfurt/Main, Germany

[22] Filed: Feb. 17, 1972

[21] Appl. No.: 227,246

Related U.S. Application Data

[63] Continuation-in-part of Ser. No. 66,551, Aug. 24, 1970, abandoned.

[30] Foreign Application Priority Data
Aug. 26, 1969 Germany.................. P 19 43 301.3
Mar. 27, 1971 Germany.................. P 21 14 925.7

[52] U.S. Cl..................... 299/8, 209/156, 209/458, 209/506
[51] Int. Cl............................................. E21c 45/00
[58] Field of Search ............... 299/8; 209/156, 447, 209/454, 458, 483–486, 506

[56] References Cited
UNITED STATES PATENTS

| | | | |
|---|---|---|---|
| 416,626 | 12/1889 | Irvin............................. | 209/485 X |
| 2,272,005 | 2/1942 | Hudson............................ | 209/458 |
| 2,926,786 | 3/1960 | Craft et al....................... | 209/506 X |
| 14,847 | 5/1856 | Auld et al......................... | 209/506 |
| 157,192 | 11/1874 | Campfield et al. ................ | 209/458 |
| 2,616,560 | 11/1952 | Vogelpoel......................... | 299/8 X |
| 2,073,122 | 3/1937 | Silke.................................. | 299/8 |

Primary Examiner—Ernest R. Purser
Attorney—Ralph D. Dinklage and Arnold Sprung

[57] ABSTRACT

A process of recovering heavy minerals from a body of natural flowing water in which said minerals are entrained, comprising a. providing in said body of flowing water adjacent the bottom thereof a collecting structure which is capable of promoting a selective settling of said heavy minerals from said body of flowing water, b. artificially agitating the bottom of said body of water upstream of said collecting structure, thereby producing a suspension of said heavy minerals and material of lower density, c. permitting said suspension to flow downstream to said collecting structure, whereby said heavy minerals selectively settle in said collecting structure and their proportion to total solids in said collecting structures is raised beyond their proportion in said suspension, and d. periodically removing the settled and concentrated heavy minerals from said collecting structure. The collector comprises walls or bristles defining settling cells of limited depth into which heavier particles settle while lighter particles are carried along by the flowing water.

13 Claims, 5 Drawing Figures

Inventor:
Norbert Hering

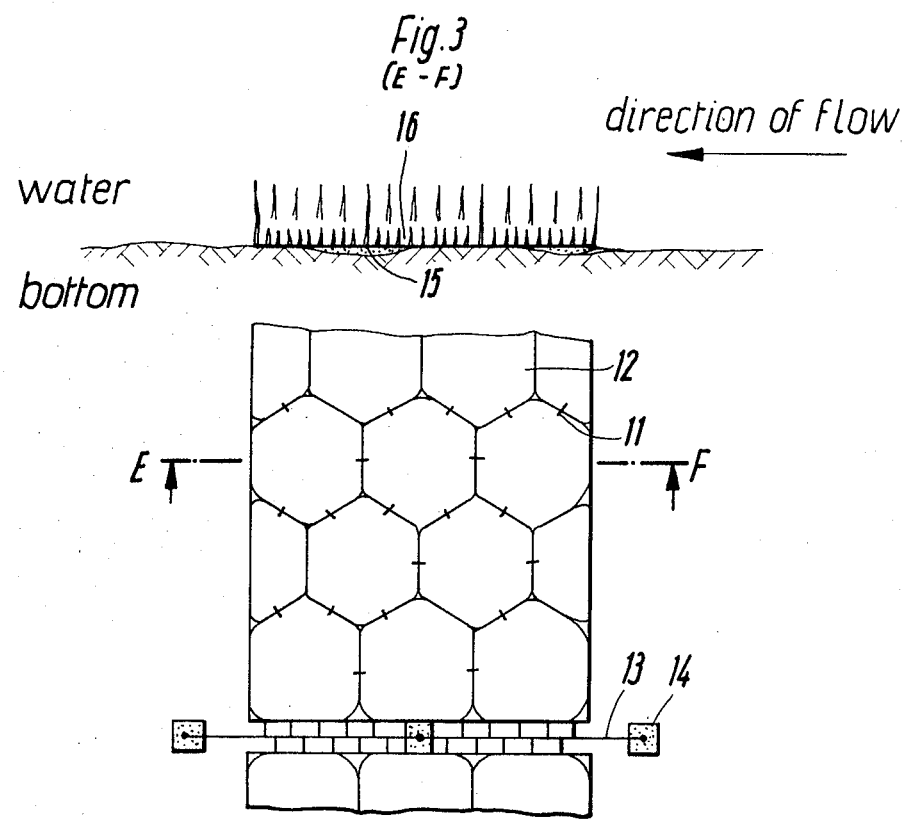

Inventor:
Norbert Hering

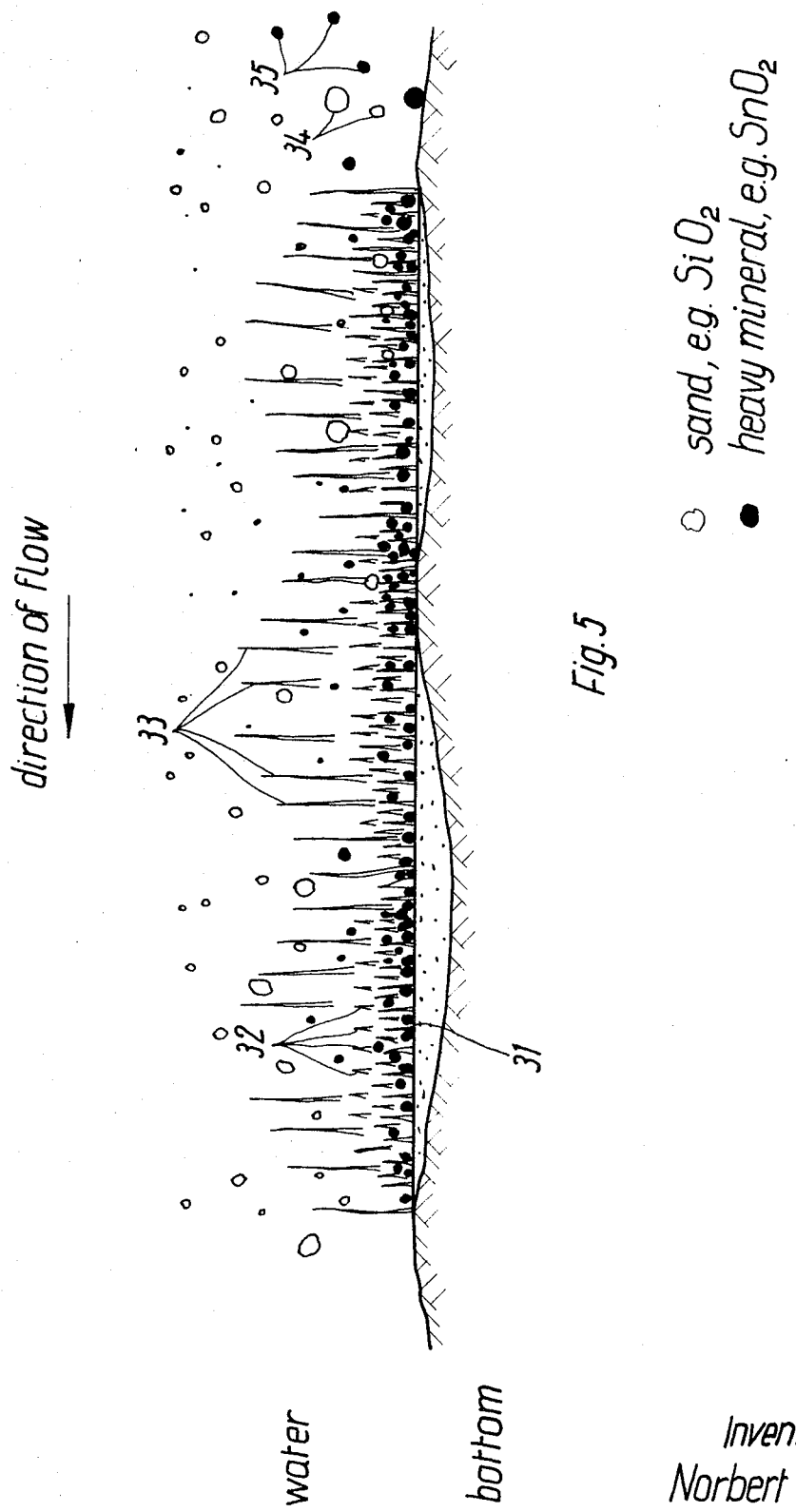

PROCESS FOR RECOVERING HEAVY MINERAL BY SELECTIVE SEDIMENTATION FROM A BODY OF FLOWING WATER

This application is a continuation-in-part of application Ser. No. 66,551, filed Aug. 24, 1970, now abandoned.

This invention relates to a process of recovering heavy minerals from bodies of flowing water by selective sedimentation.

In the shelf areas of the sea near the coast, a continuous sedimentation process is taking place because solids are entrained in considerable amounts in rivers or sea currents having a constant direction or periodically changing directions and selectively settle from the body of flowing water as a result of differences in density when the velocity of flow falls below a lower limit.

For instance, aerial photographs of the mouth of the Mississippi discharging into the Gulf of Mexico reveal clearly by the different color that the stream carries entrained solids into the Gulf over a distance of more than sixty miles.

A deposit known as "placer" may be formed in river valleys or in shelf areas by the eluviation or sedimentation of minerals having a high specific gravity. The resulting deposits of so-called mineral placers or alluvial ore constitute enriched heavy minerals, which have been detached by the abrasive action of rivers from inland areas or of the surf from the coast and have been carried offshore by the entraining force of the water. Marine currents often flow parallel to the coast and further sort the weather-worn debris, which have been presorted during the first sedimentation.

Such deposits will be formed where the conditions at the floor of the body of water are such that rising of settled particles due to turbulence has been prevented. The deposits may be disposed in shelf areas which are on a lower level and/or remote from the coast if they originated in a preglacial period and were not subjected to the sorting action of marine currents.

In a few exceptional cases the sorting due to the flowing current has resulted in such a concentration that the allocthonous deposit could be economically mined. For instance, tin stone is mined off the coast of Cornwall (Great Britain), Thailand and Indonesia. Magnetite is recovered from the bottom of the sea in the shelf areas of Japan. Diamond-containing sands are mined off the coast of South West Africa.

A periodically renewing deposit of shells is periodically mined off the west coast of Iceland. During the winter, a fairly strong, uniform west wind produces an ocean current in a direction from west to east so that large amounts of shells of a species of oyster are carried into a natural basin behind a geological barrier.

That deposit is exploited in the summer by dredging and is processed to building materials.

Heavy mineral deposits are often found in natural caverns in rock areas at the bottom of the sea.

The formation of such allochthonous deposits has already been simulated, e.g., in the washing of gold. In Malaysia, tin stone is recovered from rivers having a small gradient by means of thick planks placed into the river transversely to the direction of flow. A classical example has been told in the Greek myth of the Golden Fleece. Sheep skins were placed into a river in which gold was entrained and the heavy gold particles were preferentially collected in the skins. The concentration of heavy minerals from mixtures containing them by jigging has been taught by dressing technology for a very long time. The variety of known jigging machines indicates that a concentration of minerals by selective sedimentation from flowing liquids depends on a large number of controlling factors, which must be matched in each case. In many cases, empirical findings are more advanced than theory.

It is generally accepted that during a sedimentation process the various solid particles in a flowing liquid separate as a result of their different velocities of fall. These velocities depend on the density and size of the particles. For instance, tin stone having a density $d$ of about 7 grams per cubic centimeter and a given particle size will settle out of a liquid current which entrains quartz sand grains having three times the volume of the tin stone particles and a density $d$ of about 3 grams per centimeter.

A concentration of relatively heavy minerals by sedimentation to form a deposit is possible only in areas where shallow layers which have been formed are not continually removed and distributed by continuous or periodic currents which are superimposed on the main current and may even oppose the same.

Such deposits can form on the bottom of bodies of flowing liquid only where such bottom has a surface structure which prevents an agitation of particles once they have been settled.

There are only very few locations where both requirements, namely, the presence of a current in which heavy minerals are entrained and the presence of a surface structure which promotes the sedimentation of heavy minerals at the bottom of the flowing liquid, are met.

In connection with placer deposits in rivers, a current having a constant direction and a velocity of flow varying at a low frequency may be expected. In the shelf areas, the tide will result in more frequent changes of the direction of flow and also in more frequent changes of the velocity of flow. A study of placer deposits and experience made with jigging machines have led to the recognition that suitable artificial changes of the bottom of the body of flowing water, particularly the bottom of the sea, will promote a selective settling of heavy minerals from liquid currents in which these minerals are entrained. The invention is based on that recognition.

It is an object of the invention to provide an improved process of recovering heavy minerals from bodies of flowing water by selective sedimentation.

The processs according to the invention is characterized in that artificial collecting structures are placed on or upwardly adjacent to the bottom of the body of flowing water and the heavy minerals selectively collected by said collecting structures are removed therefrom from time to time.

The artificial collecting structures should have such a surface configuration that they retard the flow of water near the bottom of the body of flowing water so that the heavy minerals settle preferentially. Besides, the collecting structure should release the particles having a lower specific gravity and retain the heavier particles in response to a change of the direction and/or velocity of flow. The artificial collecting structures used according to the invention define a multiplicity of horizontally adjacent settling cells, which have a largest horizontal width or diagonal which does not substantially exceed their vertical depth. The collecting structures may consist, e.g., of strips of material having regularly spaced slots, which extend halfway across the strip, and assembled to define triangular or quadrangular settling cells, or of radially connected tube sections, which are circular or polygonal in cross-section. Another embodiment of the collecting structure according to the invention may be made from plastic material and is similar to a brush. It may consist, e.g., of a mat of synthetic thermoplastics provided with regularly distributed, preferably vertical bristles, which define the settling cells.

The mat is suitably provided with bristles having different lengths and bristles within a given length range are spaced equal distances apart. For instance, the short bristles may have a length of 5–15 centimeters and a width of 0.5–3 millimeters and may be spaced 0.5–3 millimeters apart whereas the long bristles have a length of 20–60 centimeters and a width of 0.5–2 millimeters and are spaced apart on the mat about 3–30 centimeters.

The substantially two-dimensional collecting structures are placed on the bottom of the body of flowing water in suitable areas and are anchored in known manner by weights. They may be used to cover an area of an order of several square meters to square kilometers. The heavy minerals collected in the settling cells of the artificial collecting structures may be recovered from time to time by means which are conventional in marine engineering, such as suction dredgers, air-lift pumps or hydrojet pumps.

The artificial collecting structures used according to the invention are placed in areas in which the existing flow is at least temporarily capable of carrying the heavy mineral to be recovered to the collecting structure. The collecting structure may have such a surface configuration that it will reduce excessive velocities of flow. The velocity of a continuous unidirectional current may be reduced by a fixed collecting structure which includes an angle of incidence up to about 30° with the direction of flow.

The artificial collecting structures need not uniformly cover the entire area which has been selected as a settling area. It will be sufficient if the above-mentioned, substantially two-dimensional structures are spaced apart in the settling area. In that case, the spaces between the individual structures should not be substantially larger than the settling cells. Collecting structures of different configuration may be placed in one and the same settling area. Each substantially two-dimensional collecting structure may constitute a combination of a honeycomb consisting of tube sections, car tires or slotted strips, on the one hand, and a brush-like mat, on the other hand; in that case, the mat forms the bottom of the collecting structure. The collecting structures need not be placed on the bottom of the body of flowing water but in dependence on the location of the current to be exploited may be spaced to some extent above the bottom. Brushlike mats are particularly suitable for this purpose.

The collecting structures used according to the invention retard the flow at their surface so that the slurry which enters the settling cells of the collecting structures is caused to settle under temporarily stagnant conditions. In that process, the flowing water is both a source of energy and an entraining agent and in an operation which requires no attendance and little maintenance ensures a supply and classification of the solids.

The process according to the invention may be used to advantage to recover valuable heavy minerals which justify a certain capital investment. Such minerals are, e.g., monazite, cassiterite (tin stone), tantalite, ilmenite, rutile, zircon, magnetite, garnet, noble metals (gold) and precious stone (diamond).

The discovery of suitable conditions of flow and suitable settling areas is a joint task of hydrologists and prospectors. These two sciences do furnish the information which is essential for the working of the invention.

The artificial collecting structures used according to the invention should consist of a material which resists sea water and should be movable at a reasonable expense to the area in which they are to be lowered. Suitable materials are plastic-coated metals, concrete, and plastics.

The form and combination of the collecting structures used in a given case will depend on the ratio between the expenditure and the results. For a recovery of highly valuable heavy minerals, more expensive artificial collecting structures may be used. Simpler types of collecting structures will be used to cover very large settling areas.

It has been found that selective sedimentation cannot be obtained unless the bottom of the body of water is disposed to enable a continuous entraining of material or the flow conditions result in an agitation of settled material from the bottom of the body of water. These requirements are not met in many cases.

This disadvantage can be overcome if the bottom of the body of water is artificially agitated in areas which are disposed upstream of the artificial collecting structures.

In a preferred embodiment of the invention, the artificial agitation is effected hydraulically or pneumatically. For this purpose, a jet of water or air under high pressure is directed into the deposit so that the material is released from the structure in which it is loosely bonded and enters the current of the overlying column of water. That current may be due, e.g., to the tides.

Agitation may also be effected by the intermittent firing of placed explosive charges.

The agitation may also be effected by a mechanical working of the bottom of the body of water. Plows may be used for this purpose and may be drawn through the bottom and towed, e.g., by a moving ship, or moved between two fixed stations. Wheels operating like hay tedders or fork wheels may be similarly used.

Instead of from a ship, the agitating equipment may be operated from buoys or underwater stations. The energy of the water flowing past such means may be transformed into a rotary movement mechanically or indirectly by a generator-motor assembly. The energy may also be supplied from the shore entirely or in part. In larger areas, e.g., in coastal shelves where a plurality of the units for artificial agitation are used, a central control may be adopted.

To ensure that the suspension which has been formed by the agitation is supplied as fully as possible to the artificial collecting structures which have been placed to cause a selective sedimentation, it is desired to provide guide means. Such guide means may consist, e.g., of guide plates which may consist of metallic or nonmetallic materials and which may adjust themselves to appropriate positions in response to the flow conditions. Dam- or platform-like structures may also be used to provide flow channels.

It may be desirable to use flaps which are disposed very close to the collecting structures which intermittently act on the flowing water so as to transform the continuous current of water into pulsating surges of water whereby sediment having a lower specific gravity is displaced and an enriching of the heavy mineral component is promoted.

Some embodiments of artificial collecting structures are diagrammatically shown by way of examples in the drawings, in which FIG. 1 is a top plan view showing a collecting structure which consists of interfitted crossing strips having regularly spaced slots extending halfway across the strips.

FIG. 2 is a top plan view showing a collecting structure which is assembled from tube sections having a polygonal cross-section.

FIG. 3 is a vertical sectional view taken on line E-F of FIG. 2.

FIG. 5 is a brushlike collecting structure made of plastic material.

Figure 1:
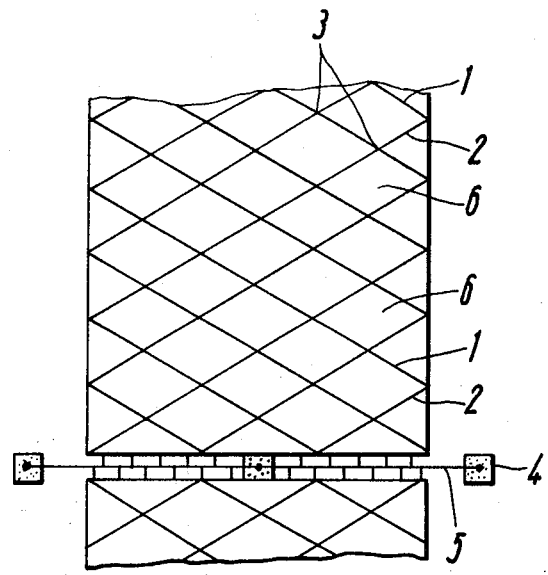

The embodiment shown in FIG. 1 consists of crossing strips 1 and 2, which have the same width and at the regularly spaced intersections are provided with slots extending halfway across the strip. The crossing strips are interfitted like strips in packages for electric bulbs, fruit or eggs. The strips may consist of plastic material, plastic-covered metal or the like. The interfitted strips are firmly clipped together at the intersections. The resulting structures are lowered to the bottom of the body of flowing water and secured by ropes 5 to heavy anchoring elements 4. In this embodiment, the settling cells 6 may be triangular or quadrangular. For settling cells having a side length of about 50 centimeters, it is recommended to use strips which are about 40–60 centimeters wide.

The same reference characters as in FIG. 1 are used in FIG. 2, which shows an embodiment consisting of tube sections 11, which have a polygonal cross-section and preferably the same length. The tube sections 11 may be connected by bolts 12 or the like to form a substantially two-dimensional structure, which forms an element of an artificial collecting structure. These elements may be placed on the bottom of the body of water in the selected settling area and may be connected, e.g., by ropes 13 to heavy anchoring elements 14.

FIG. 3 is a vertical sectional view of the structure of FIG. 2 but is analogously applicable to the structure of FIG. 1. FIG. 3 indicates also a combination of honeycomb and brushlike structures because it shows a mat 15 provided with bristles 16.

Figure 4:
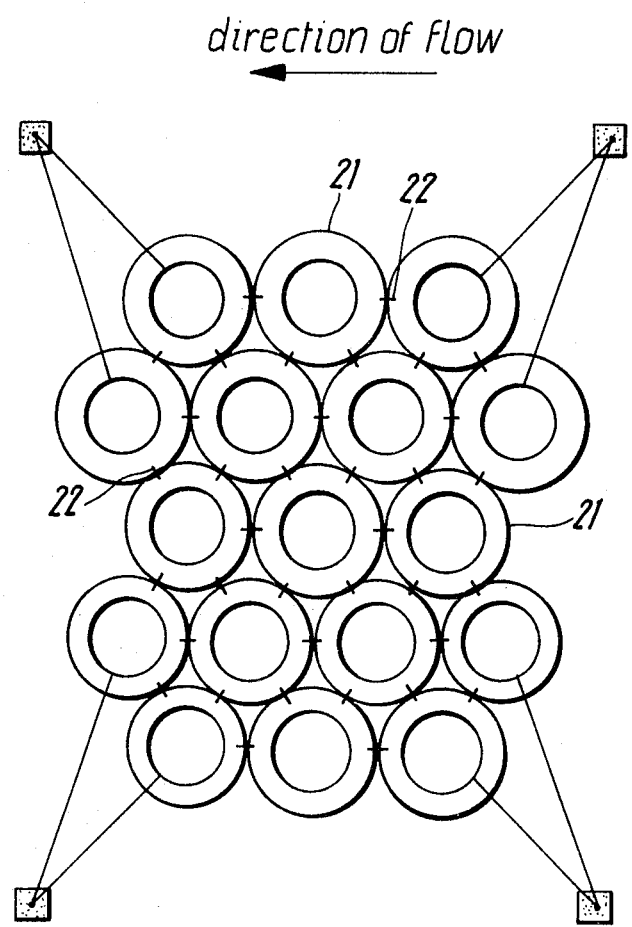
FIG. 4 is a top plan view showing a collecting structure assembled from worn-down car tires.

The collecting structure shown in FIG. 4 is assembled from worn-down car tires 21. The tires may be packed together as closely as possible, as is shown, so that the points of contact between three adjacent tires lie on an equilateral triangle and each tire contacts six other tires. In another arrangement, each tire may contact only four other tires. The tires may be connected by rivets 22 or by stitching by means of a rope of wire or plastic material at the points of contact between the tires.

In the embodiment shown in FIG. 5, a substantially two-dimensional collecting structure consists of a brush-like structure of plastic material. A mat 31 carries bristles, which are preferably equally spaced apart on the mat and define the corners of the settling cells. These bristles may have different lengths so that there are short bristles 32 and long bristles 33, the latter being spaced larger distances apart.

The heavy minerals settle preferentially between the closely spaced short bristles 32, which have a length of about 5–15 centimeters and are spaced apart by a distance which is of the order of the thickness or width of the bristles. The longer bristles 33 have a length of about 20–50 centimeters and are regularly spaced about 3–15 centimeters apart over the substantially two-dimensional structure and retard the flow over the settling cells. The small particles of the heavy mineral enter the settling cells between the short bristles so that these particles are substantially removed from the influence of changes in the flow conditions. The coarser particles of the lighter mineral remain adjacent to the longer bristles and are entrained by the flowing liquid under changing conditions.

FIG. 5 illustrates this differential behavior of particles which differ in size and density by the representation of heavy particles 35 by solid or black areas and of light particles 34 by white areas. The heavy particles which are collected between the short bristles 32 in the course of time may be recovered by a suction operation in suitable intervals of time, e.g., twice to four times a year.

A honeycomb of joined automobile tires as shown in FIG. 4 on a bed over which a river flows at about 2 miles an hour in combination with dynamite charges once a month at distances from one to five miles upstream of the collector serves to enrich the proportion of solids of high specific gravity to total solids within the collectors in contrast with the proportion of such material to total solids just below such collectors.

It will be appreciated that the instant specification and examples are set forth by way of illustration and not limitation, and that various modifications and changes may be made without departing from the spirit and scope of the present invention.

What is claimed is:

1. A process of recovering heavy minerals from a body of natural flowing water in which said minerals are entrained, comprising
   a. providing in said body of flowing water adjacent the bottom thereof a collecting structure which is capable of promoting a selective settling of said heavy minerals from said body of flowing water,
   b. artificially agitating the bottom of said body of water upstream of said collecting structure, thereby producing a suspension of said heavy minerals and material of lower density,
   c. permitting said suspension to flow downstream to said collecting structure, whereby said heavy minerals selectively settle in said collecting structure and their proportion to total solids in said collecting structures is raised beyond their proportion in said suspension, and
   d. periodically removing the settled and concentrated heavy minerals from said collecting structure.

2. A process as set forth in claim 1, in which said collecting structure comprises means for reducing the velocity of the water.

3. A process as set forth in claim 1, in which said collecting structure is provided in a body of water flowing continuously in a substantially constant direction and said collecting structure is placed to define an angle of incidence up to 30° with said direction.

4. A process as set forth in claim 1, in which said collecting structure defines a multiplicity of horizontally adjacent settling cells and each of said cells has a predetermined vertical dimension and a maximum horizontal dimension which does not substantially exceed said vertical dimension.

5. A process as set forth in claim 4, in which said collecting structure comprises strips formed with regularly spaced slots extending halfway across the strips and said strips are assembled to define polygonal settling cells.

6. A process as set forth in claim 4, in which said collecting structure comprises vertical tube sections of about the same height and radially connected to each other.

7. A process as set forth in claim 4, in which said collecting structure comprises radially connected annular hollow bodies having generally vertical axes and a slotted inside peripheral wall.

8. A process as set forth in claim 4, in which said collecting structure comprises a mat having bristles extending upwardly therefrom and defining said settling cells.

9. A process as set forth in claim 8, in which said mat is provided with short and long bristles extending upwardly from said mat, said short bristles are regularly spaced and define said settling cells, and said long bristles are also regularly spaced.

10. A process as set forth in claim 1, in which the agitation of the bottom of the body of water of step (b) is performed hydraulically or pneumatically.

11. A process as set forth in claim 1, in which the agitation of the body of water of step (b) is performed by explosive charges.

12. A process as set forth in claim 1, in which the agitation of the bottom of the body of water of step (b) is performed by mechanical working.

13. A process as set forth in claim 1, in which the supply of said suspension of step (c) is promoted by flap-type means which produce pulsating surges of water.

* * * * *